Figure 1:
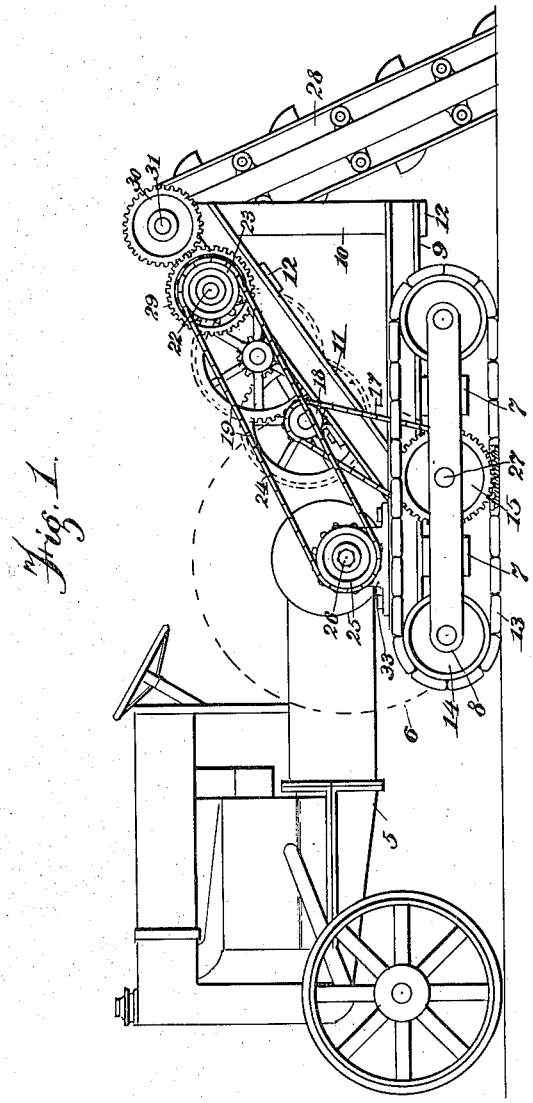

June 26, 1923.

D. W. STOOKEY

TRENCHING MACHINE

Filed June 11, 1921

1,460,117

2 Sheets-Sheet 1

Inventor
Daniel W. Stookey
By J. M. St. John,
Atty.

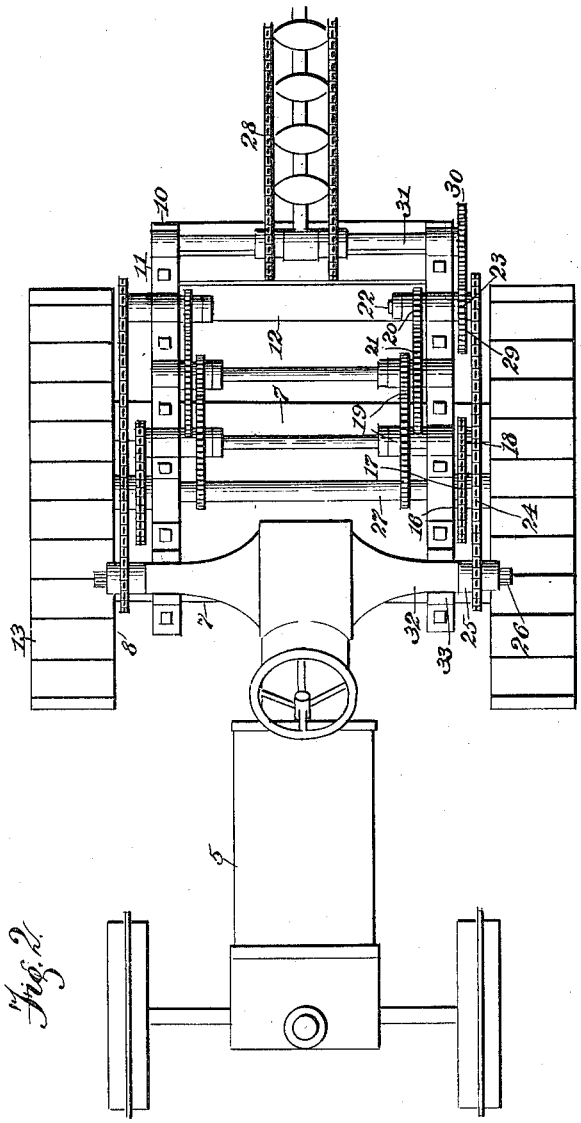

Patented June 26, 1923.

UNITED STATES PATENT OFFICE.

DANIEL W. STOOKEY, OF CEDAR RAPIDS, IOWA.

TRENCHING MACHINE.

Application filed June 11, 1921. Serial No. 476,770.

*To all whom it may concern:*

Be it known that I, DANIEL W. STOOKEY, a citizen of the United States, residing at Cedar Rapids, in the county of Linn and State of Iowa, have invented certain new and useful Improvements in Trenching Machines; and I do hereby declare the following to be a full, clear, and exact description of the invention, such as will enable others skilled in the art to which it appertains to make and use the same.

This invention relates to ditching machines, and the object of the invention is to produce a light and simple ditcher adapted for easy attachment to an ordinary farm tractor, and by means of which the farmer may trench his fields preparatory to the laying of the smaller sizes of tilling.

The invention is disclosed in the description and claims following reference being had to the accompanying drawings, in which:—

Fig. 1 is a side elevation of a ditching apparatus embodying my invention. Fig. 2 is a plan view of the same.

In the drawing, the numeral 5 denotes a farm tractor of a familiar type, well known as the "Fordson" tractor. This is equipped with large traction wheels, not herein shown, but one of such wheels is indicated by the large dotted circle 6 in Fig. 1. Traction for the ditcher is best supplied by other means, as will be set forth hereafter.

The ditching apparatus is a self-contained, unitary structure, excepting only the driving mechanism, which is supplied by the tractor. It is to be noted also that the tractor supplies a considerable part of the weight of the consolidated machine, for the purpose of propulsion, and to counteract the pull of the excavator, which as herein shown tends to lift the forward part of the apparatus.

On the bolsters 7 of a pair of creepers 8 is mounted a frame, comprising a pair of sills 9, uprights 10, and diagonal beams 11. These triangular sides are tied together by crossbars 12, making a strong and rigid structure to carry the excavating and propelling mechanism. The creeper is here shown as of a simple type, the linked apron 13 being carried on terminal drums 14, and driven by a mid-wheel or drum 15 geared to the rack-toothed inner part of the apron, as shown in Fig. 1. To each of these geared drivers connects a sprocket 16, which carries a sprocket chain 17 running over a smaller sprocket 18 at each side of the machine. This derives its very slow motion from a train of reducing gearing 19 driven by a pinion 20 meshing with one of the large spur-gears 21 at each side of the machine. The pinion is attached to a short shaft 22, carrying at its outer end a sprocket 23. Each of these sprockets is driven by a chain 24 from a small sprocket 25 affixed to the driving axle of the tractor, 26, after the main tractor wheel, each side, has been removed. It is to be understood that the drivers 15 turn independently on their supporting axle 27, and it will thus be evident that the creepers are independent of each other, except as actuated by the differential gearing which operates the driving axles of the tractor. This gives the same freedom of movement to the creepers as to the traction-wheels of the tractor, in turning, and in moving over highways and from field to field.

The excavator 28 is of a familiar type, and need not be particularly described. Its movement is the reverse of that imparted to the creepers, and is secured by a pair of spur gears 29 and 30, the former connecting with the sprocket 23, and the latter with the driving shaft 31 of the excavator.

In the case of the tractor herein shown, the connection of the tractor and ditcher is very simple, and is easily and quickly effected. Referring to Fig. 2 it will be seen that the driving axles of the tractor are enclosed in laterally extending housings 32. These are made to connect directly with the ditcher frame by providing the latter with saddles 33 to receive said housings. To combine the tractor and ditching apparatus into a single organized machine, it is only necessary to jack up the rear axle of the tractor; remove the main drive-wheels; attach the drive-sprockets in place thereof, bring the ditcher to proper position; settle the tractor housings into their saddles, and finally connect the drive-chains 24.

This provides the farmer, who is equipped with a plowing tractor, with the means for tilling his wet land easily and at comparatively little expense, since the fine and expensive part of the apparatus is all in the tractor, and no special mechanical skill is required in the building of the ditching apparatus. The machine, as will be seen, is comparatively short and compact, permitting close work at the ends, and giving it practically the flexibility of movement in the field and on the road possessed by the tractor alone.

Having thus described my invention, I claim:

1. In combination with a tractor, an excavator, actuating mechanism therefor connecting with and driven by the power plant of the tractor, and a supporting and carrying frame for the excavator detachably connected with the tractor.

2. The combination with a tractor, of excavating apparatus, comprising traction mechanism, operating gearing for the excavator and the traction mechanism, and a supporting frame, and driving mechanism connecting the power plant of the tractor with the excavator by removing the main tractor wheels and attaching driving-wheels in place thereof.

3. The combination with a tractor having rear axles driven by its motor traction-wheels and laterally extending axle supports, of a unitary trench excavator having a frame provided with seats for said axle supports.

4. The combination with a tractor having rear axles driven by its motor traction-wheels removably mounted thereon of a unitary excavator having separately and independently geared means for propulsion at opposite sides thereof, and means attachable in place of the tractor-wheels for driving said independent means for propulsion.

5. The combination with a tractor having removable traction-wheels on axles driven by the tractor, of a unitary excavating apparatus, comprising a trenching excavator, actuating mechanism therefor, carrying and propelling mechanism at opposite sides, independent actuating mechanism therefor, drivers attached in place of the removed tractor-wheels, and independent connections thereof with the propelling mechanism of the excavating apparatus.

6. Combined with a tractor having self actuated laterally extending driving axles with removable wheels, supplemental drive-wheels attached in place of the original traction-wheels, and a unitary excavating apparatus provided with all means of excavation and propulsion except said supplemental drive-wheels, and having seats to receive said axle-housings, and means for transmitting power from the tractor to said excavating apparatus.

In testimony whereof I affix my signature in presence of two witnesses.

DANIEL W. STOOKEY.

Witnesses:
F. W. ARMSTRONG,
D. L. WOOD.